M. BAJAR.
ANTISKID ATTACHMENT FOR VEHICLE WHEELS.
APPLICATION FILED JUNE 4, 1914.
1,118,390. Patented Nov. 24, 1914.
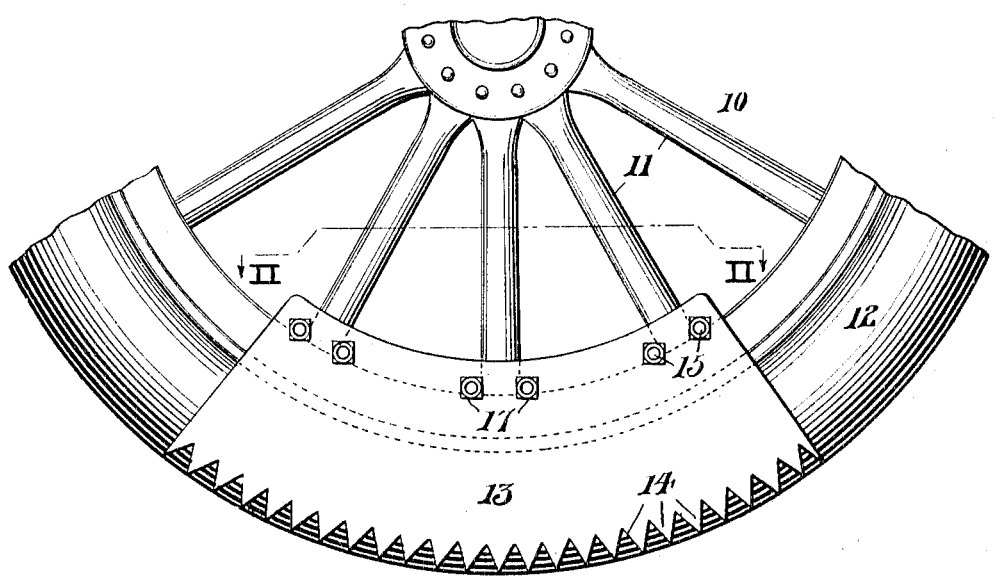
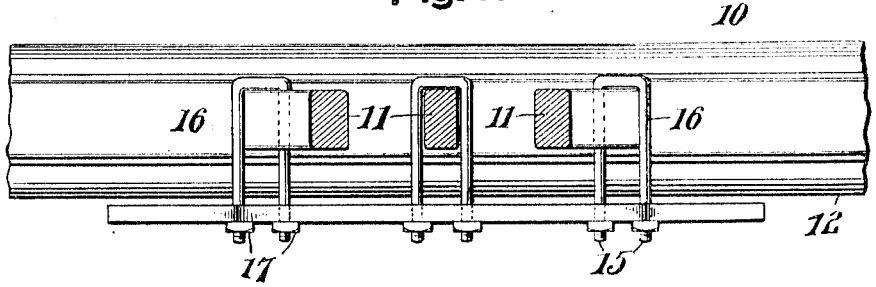
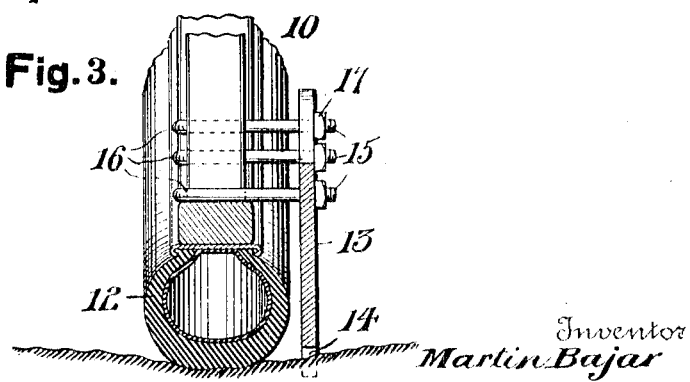

UNITED STATES PATENT OFFICE.

MARTIN BAJAR, OF VANDERBILT, PENNSYLVANIA, ASSIGNOR OF ONE-HALF TO JOSEPH MAKSIN, OF VANDERBILT, PENNSYLVANIA.

ANTISKID ATTACHMENT FOR VEHICLE-WHEELS.

1,118,390. Specification of Letters Patent. Patented Nov. 24, 1914.

Application filed June 4, 1914. Serial No. 842,933.

*To all whom it may concern:*

Be it known that I, MARTIN BAJAR, a subject of the Emperor of Austria-Hungary, residing at Vanderbilt, in the county of Fayette and State of Pennsylvania, have invented certain new and useful Improvements in Antiskid Attachments for Vehicle-Wheels, of which the following is a specification.

This invention relates to certain new and useful improvements in anti-skid attachments for vehicle wheels.

An object of the invention is to provide an anti-skid attachment for vehicle wheels which will prevent the wheel from sliding laterally should the same attempt to skid and will in no way interfere with cushioning properties of an automobile wheel.

A further object of the invention is to provide an anti-skid attachment for vehicle wheels which will become operative when the wheel attempts a side sliding or skidding movement, but which is normally out of rigid contact with the road surface when the wheel is moving in the usual forward or backward direction, thus obviating undue injury to concrete pavements or other highways.

With the above and other objects in view that will appear as the nature of the invention is better understood, the same consists in the novel construction, combination and arrangement of parts to be hereinafter more fully described and then claimed.

In the accompanying drawing which shows the preferred embodiment of my invention and to which reference is had herein by like characters designating corresponding parts throughout the several views:—Figure 1 is a side elevational view of a portion of a wheel embodying my invention. Fig. 2 is a horizontal sectional view taken on line II—II of Fig. 1, and Fig. 3 is a cross sectional view taken through the anti-skid plate shown in Fig. 1.

The usual form of anti-skid device in the present day use is of such form and construction as to continuously engage the road surface and owing to the peculiar construction of such anti-skid devices comprising sharpened points and projections, undue injury to the road results.

The principal object of the present invention is to obviate this injury to the road and at the same time provide a device which will positively grip the road at times only when the vehicle wheel attempts to skid. Such a device is shown in the accompanying drawing and for the purpose of illustration is attached to an automobile wheel 10 consisting of the usual spokes 11 and tire section 12. The present invention comprises in detail an arcuate-shaped plate 13 having its outer edge provided with a plurality of teeth or spurs 14 that are arranged to lie in position adjacent the tread surface of the tire 12. The plate 13 is suitably apertured adjacent its inner edge for the reception of the threaded ends 15 of U-shaped staples 16, the staples surrounding at their closed ends the spokes 11 and having mounted on the threaded ends thereof outwardly of the said plate 13 the locking nuts 17.

It is believed that the operation will be clearly apparent from the above description and illustration and it is to be noted that the staples 16 are permitted to have a limited movement relative to the spokes 11 so that when the wheel 10 is running in the usual manner the spurs 14 are not in rigid contact with the road surface. The plates are prevented from undue rattling and jarring motion by a centrifugal force imparted thereto from the rotating wheel and should the wheel 10 attempt to side slide or skid the staples will bind upon the spokes and the teeth 14 will positively engage the road surface as illustrated in Fig. 3 and prevent such skidding movement. While the drawing shows the application of a single anti-skid plate 13, I do not wish to confine myself to the number used as any number of such plates could be suitably positioned about the tire 12.

While I have shown and described the preferred embodiment of my invention, I do not wish to confine myself to the exact details of construction shown, as various forms, modifications and arrangements of the parts as shown may be had without departing from the spirit and scope of the invention as claimed.

What I claim as new is:—

The combination with a wheel and tire of an antiskid attachment comprising an arcuate-shaped plate serrated at its outer edge to provide teeth constituting the road engaging means, but which normally do not project beyond the tread surface of the tire, of U-shaped staples mounted on the wheel spokes with the ends thereof passed through the plate and means for retaining said bolts in connection with said plate, said staples being adapted to bind upon the spokes to cause the teeth to engage the road surface when the wheel slides side-wise.

In testimony whereof I affix my signature in presence of two witnesses.

MARTIN BAJAR.

Witnesses:
JOSEPH VECCHIO,
O. R. BROUNFIELD.